United States Patent
Koch et al.

(10) Patent No.: US 9,409,261 B2
(45) Date of Patent: Aug. 9, 2016

(54) RETAINING DEVICE FOR THE FORM-FITTING AND/OR FORCE-FITTING ARRANGEMENT OF TWO COMPONENTS TO BE CONNECTED IN A BONDED MANNER, AND METHOD FOR OPERATING SUCH A RETAINING DEVICE

(71) Applicant: Johnson Controls Components GmbH & Co. KG., Kaiserslautern (DE)

(72) Inventors: Albert Koch, Breunigweiler (DE); Volker Scholl, Sippersfeld (DE)

(73) Assignee: Johnson Controls Components GmbH & Co. KG., Kaiserslautern (DE)

( * ) Notice: Subject to any disclaimer, the term of this patent is extended or adjusted under 35 U.S.C. 154(b) by 0 days.

(21) Appl. No.: 14/418,269

(22) PCT Filed: Aug. 1, 2013

(86) PCT No.: PCT/EP2013/066155
§ 371 (c)(1),
(2) Date: Jan. 29, 2015

(87) PCT Pub. No.: WO2014/020097
PCT Pub. Date: Feb. 6, 2014

(65) Prior Publication Data
US 2015/0298265 A1 Oct. 22, 2015

(30) Foreign Application Priority Data
Aug. 2, 2012 (DE) .......................... 10 2012 213 651

(51) Int. Cl.
| | | |
|---|---|---|
| B23K 37/04 | (2006.01) | |
| B21D 39/02 | (2006.01) | |
| B25B 5/06 | (2006.01) | |
| B25B 5/16 | (2006.01) | |
| B23K 26/20 | (2014.01) | |

(52) U.S. Cl.
CPC .......... *B23K 37/0408* (2013.01); *B21D 39/021* (2013.01); *B23K 26/20* (2013.01); *B25B 5/061* (2013.01); *B25B 5/163* (2013.01)

(58) Field of Classification Search
None
See application file for complete search history.

(56) References Cited

U.S. PATENT DOCUMENTS 1,930,642 A * 10/1933 Clark ................. B23K 37/0435
228/50
2,659,278 A * 11/1953 Schultz .................... B41D 5/00
269/27

(Continued)

FOREIGN PATENT DOCUMENTS

DE 18 97 897 U 7/1964
DE 16 27 558 A1 1/1971

(Continued)

*Primary Examiner* — Kiley Stoner
(74) *Attorney, Agent, or Firm* — McGlew and Tuttle, P.C.

(57) ABSTRACT

A retaining device (1) for the form-fitting and/or force-fitting arrangement of two components (2, 3) to be connected in a bonded manner for a subsequent welding process. The retaining device (1) includes a cover (4), which can be pivoted about a pivot axis (5) and on the lower face of which a silicone layer (8) is arranged so as to face in the direction of the components (2, 3) to be connected, and a pressure plate (6) that can be moved in the direction of the cover (4) via at least one cylinder (7) and thus presses the components (2, 3) which are to be connected and which are arranged one above the other between the cover (4) and the pressure plate (6) against the silicone layer (8). A method for operating a retaining device (1) is also provided.

13 Claims, 5 Drawing Sheets

(56) References Cited

U.S. PATENT DOCUMENTS

| | | | | |
|---|---|---|---|---|
| 2,675,699 A * | 4/1954 | Tilden | G01N 19/04 | 269/25 |
| 3,082,318 A * | 3/1963 | Heath | B23K 9/0035 | 219/137 R |
| 3,281,140 A * | 10/1966 | Smierciak | B25B 5/064 | 269/24 |
| 3,286,342 A * | 11/1966 | Seeloff | B23K 37/0408 | 228/13 |
| 3,439,813 A * | 4/1969 | Najmowicz | B23K 37/047 | 198/345.3 |
| 3,533,155 A | 10/1970 | Coucoulas | | |
| 3,554,529 A * | 1/1971 | Thomas | B25B 5/064 | 269/32 |
| 3,589,591 A * | 6/1971 | Schwenn | H01R 43/0256 | 228/180.1 |
| 3,967,817 A * | 7/1976 | McClocklin | B25B 5/064 | 269/32 |
| 4,236,060 A * | 11/1980 | Butz | B23K 31/02 | 219/125.1 |
| 4,347,426 A * | 8/1982 | Ware | B23K 9/007 | 219/125.1 |
| 4,602,139 A * | 7/1986 | Hutton | H05B 6/105 | 156/273.7 |
| 4,654,495 A * | 3/1987 | Hutton | B60R 13/08 | 156/274.2 |
| 4,710,608 A * | 12/1987 | Noda | B23K 37/0426 | 219/125.1 |
| 4,723,800 A * | 2/1988 | Sanders | B25B 5/147 | 294/106 |
| 5,092,510 A * | 3/1992 | Anstrom | H05K 13/0465 | 228/106 |
| 5,107,577 A * | 4/1992 | Jackson | B23Q 1/4866 | 29/281.4 |
| 5,141,093 A * | 8/1992 | Alexander | B23K 37/047 | 198/345.1 |
| 5,160,124 A * | 11/1992 | Yamada | B23Q 3/103 | 269/152 |
| 5,234,204 A * | 8/1993 | Hunt | B27M 3/0073 | 269/41 |
| 5,407,519 A * | 4/1995 | Joffe | B29C 43/56 | 156/358 |
| 5,423,716 A * | 6/1995 | Strasbaugh | B23B 31/307 | 269/21 |
| 5,897,108 A * | 4/1999 | Gordon | H05K 13/0069 | 269/310 |
| 6,371,469 B1 * | 4/2002 | Gray | B25B 5/147 | 269/234 |
| 8,100,046 B2 * | 1/2012 | Tunkers | B30B 15/161 | 269/32 |
| 2001/0037862 A1 | 11/2001 | Moriuchi | | |
| 2002/0134820 A1 * | 9/2002 | Kemmerer | B23K 37/0443 | 228/245 |
| 2007/0056157 A1 * | 3/2007 | Hirata | B23K 3/087 | 29/593 |
| 2007/0246877 A1 * | 10/2007 | Laing | B23Q 3/082 | 269/23 |
| 2008/0087709 A1 * | 4/2008 | Mackay | B23K 3/0623 | 228/49.5 |
| 2009/0084828 A1 * | 4/2009 | Sohl | B21B 15/0085 | 228/44.3 |
| 2009/0230171 A1 * | 9/2009 | Matsumura | B30B 5/02 | 228/44.7 |
| 2010/0066002 A1 * | 3/2010 | Yokota | B23Q 3/06 | 269/257 |
| 2010/0163604 A1 * | 7/2010 | Noe | B21C 47/247 | 228/114 |
| 2011/0248142 A1 * | 10/2011 | Young | B23D 59/00 | 248/346.06 |
| 2012/0125973 A1 * | 5/2012 | Packer | B23K 20/126 | 228/2.1 |
| 2014/0124999 A1 * | 5/2014 | Foss | B25B 5/003 | 269/276 |
| 2014/0183181 A1 * | 7/2014 | Ash | B23K 1/002 | 219/616 |
| 2014/0299582 A1 * | 10/2014 | Mizuno | B23K 20/02 | 219/78.02 |
| 2015/0145194 A1 * | 5/2015 | Kaiser | B44F 9/02 | 269/32 |
| 2015/0145195 A1 * | 5/2015 | Fukui | B25B 5/16 | 269/32 |

FOREIGN PATENT DOCUMENTS

| | | | | |
|---|---|---|---|---|
| DE | 17 90 300 A1 | 11/1973 | | |
| DE | 2903046 A1 * | 8/1979 | | B23K 37/0461 |
| DE | 3137100 A1 * | 5/1982 | | B25B 5/061 |
| DE | 36 35 359 A1 | 4/1988 | | |
| DE | 201 06 367 U1 | 7/2001 | | |
| DE | 10 2004 052951 A1 | 5/2006 | | |
| DE | 10 2008 052489 A1 | 4/2010 | | |
| FR | 2 959 692 A1 | 11/2011 | | |
| JP | 2001 347384 A | 12/2001 | | |

* cited by examiner

RETAINING DEVICE FOR THE FORM-FITTING AND/OR FORCE-FITTING ARRANGEMENT OF TWO COMPONENTS TO BE CONNECTED IN A BONDED MANNER, AND METHOD FOR OPERATING SUCH A RETAINING DEVICE

CROSS REFERENCE TO RELATED APPLICATIONS

This application is a United States National Phase Application of International Application PCT/EP2013/066155 filed Aug. 1, 2013 and claims the benefit of priority under 35 U.S.C. §119 of German Patent Application DE 10 2012 213 651.7 filed Aug. 2, 2012, the entire contents of which are incorporated herein by reference.

FIELD OF THE INVENTION

The invention relates to a retaining device for the form-fitting and/or force-fitting arrangement of two components to be connected in a bonded manner for a subsequent welding operation. The invention further relates to a method for operating such a retaining device.

BACKGROUND OF THE INVENTION

From the prior art, there are known a large number of different retaining devices for the form-fitting and/or force-fitting arrangement of two components to be connected in a bonded manner for a subsequent welding operation. In this instance, a plurality of hydraulic or pneumatic cylinders acts at the upper side on one of the components to be connected and thus presses the components one against the other.

DE 16 27 558 A discloses a device for clamping metal sheets, in particular strips in strip welding machines, the metal sheets being clamped between pairs of clamping jaws, at least one clamping jaw of each clamping jaw pair being constructed so as to be sub-divided over the width thereof and in that the individual clamping jaw components can be moved with respect to each other in a limited manner.

DE 201 06 367 U1 describes a clamping module for clamping workpieces or other objects, having a rigid base member and a clamping member which is deployable relative to the base member by means of the action of fluid, which are connected to each other by means of an annularly enclosed membrane member which delimits a fluid action chamber and which, when the clamping member is retracted, is arranged at least partially in a receiving recess of the base member and, when the clamping member is deployed, is extended further out of the receiving recess, a support sleeve which is arranged coaxially with respect to the membrane member and which can be moved relative thereto and relative to the base member and which, when the clamping member is retracted, is located in the receiving recess upstream of the membrane member and, when the clamping member is deployed, is pushed out by the jointly moving membrane member so that it surrounds the longitudinal membrane portion which is upstream of the receiving recess at the outer side.

DE 36 35 359 A1 discloses a clamping element having a base member and a clamping portion which is arranged thereon. The clamping portion is a flexible clamping membrane which delimits with the base member a pneumatic chamber which is sealed in an outward direction and which is connected to at least one control channel, and at the membrane outer face of which facing away from the base member the clamping face is arranged, the pneumatic chamber being able to be filled or ventilated with pressure medium via the at least one control channel in order to control the clamping face position.

DE 18 97 897 U describes a clamping device for securely clamping workpieces in processing machines or to workbenches, such as bench vices, planing benches or the like.

DE 17 90 300 A describes a method for connecting a large number of workpieces to one or more substrates, wherein the workpieces are placed on the substrate and there is arranged on the workpieces a resilient flexible means, to which a pressure is applied and transmitted to the workpieces by means of the compressed, resilient flexible means, the pressure which is applied and the pressure which is transmitted acting in the same direction, and wherein, by using the pressure transmitted to the workpieces, the workpieces are connected to the substrate by means of thermal compression or ultrasound, the pressure transmitted via the resilient flexible means being applied to all the workpieces in order to act on the substrate.

SUMMARY OF THE INVENTION

An object of the present invention is to provide a retaining device which is improved compared with the prior art and an improved method for operating a retaining device.

The retaining device for the form-fitting and/or force-fitting arrangement of two components to be connected in a bonded manner for a subsequent welding operation comprises a pivotable cover, on which there is arranged at the lower side a silicone layer directed in the direction of the components to be connected, and a pressing plate which is movable in the direction of the cover by means of at least one cylinder and which thus presses the components, which are arranged one above the other between the cover and pressing plate and which are intended to be connected, against the silicone layer. A plurality of hydraulic or pneumatic cylinders which are generally present are replaced by this silicone layer. Furthermore, the open loop and/or closed loop means which are required to operate the cylinders are avoided. The costs of such a retaining device are thereby significantly reduced.

Furthermore, by means of the silicone layer, the maintenance costs of the retaining device are significantly reduced since the particle dust which occurs during the welding operation and which generally adheres to the piston rods of the cylinders and wears and damages the corresponding seals is not bonded to the silicone layer and can be simply wiped away.

Advantageously, the silicone layer is constructed so as to correspond to an upper component. The silicone layer and the component are thereby in abutment with each other extensively so that particularly uniform and constant pressure distribution on the component is produced.

Advantageously, the silicone layer is constructed so as to be compressible. In this manner and as a result of the extensive abutment between the silicone layer and component, there is a particularly uniform introduction of pressure into the component. It is thereby possible to use components with reduced material thickness compared with the prior art since the deformations, which generally occur in thin sheet metal components and which are also referred to as markings, are prevented by the cylinders which act locally on the component.

In a preferred embodiment, the silicone layer is formed from a single silicone block element. This enables rapid and simple replacement of a worn silicone layer.

In an alternative embodiment, the silicone layer is composed of a plurality of silicone block elements. In this instance, it is possible, for example, to replace portions of the silicone layer which are subjected to particularly high thermal loads in the region of the weld connections to be produced separately from the remaining silicone layer.

Preferably, the silicone layer is arranged on the cover in a form-fitting and/or force-fitting manner. The silicone layer can thereby be readily replaced so that a retaining device can be used in a variable manner by means of differently profiled silicone layers in order to connect components which are formed differently. To this end, the silicone layer is arranged on the cover in a reversible manner.

In a particularly preferred manner, the silicone layer is screwed to the cover.

In an advantageous embodiment, there are arranged in the region of bonded connections, which are intended to be formed between the components, recesses which extend through the cover and the silicone layer. A corresponding welding device, in particular a laser welding device, can thereby form the weld connections through the cover and silicone layer.

The method for operating a retaining device comprises a first method step, in which a first component is placed on guides and/or retention means which are arranged on a pressing plate, a second method step, in which a second component is placed on the first component and is orientated by means of the guides, a third method step, in which a pivotable cover having a silicone layer is pivoted in the direction of the second component and locked in such a manner that the silicone layer and the second component are extensively in abutment with each other, a fourth method step, in which the pressing plate is moved in the direction of the cover by means of at least one cylinder, a fifth method step, in which the components which are pressed against each other between the cover and pressing plate are welded to each other through recesses which extend through the cover and silicone layer, and a sixth method step, in which the component assembly formed by the components is removed from the retaining device after a pivoting movement of the cover.

Using this method, a particularly simple, rapid and cost-effective, bonded connection of two components is enabled in order to form a component assembly.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
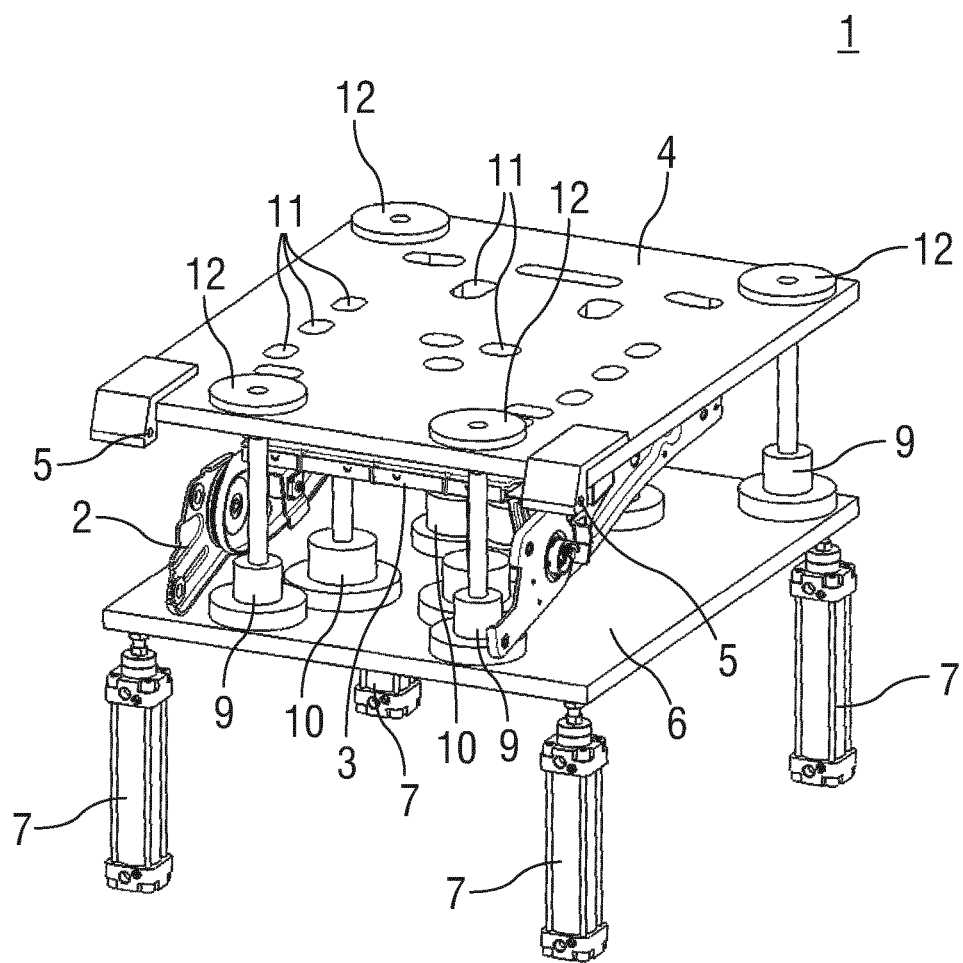
FIG. 1 is a schematic, perspective view of a retaining device according to the invention.

Components which correspond to each other are given the same reference numerals in all the Figures.

FIG. 1 is a schematic, perspective view of a retaining device 1 according to the invention.

Such a retaining device 1 is used for the form-fitting and/or force-fitting arrangement of two components 2, 3 to be connected in a bonded manner for a subsequent welding operation. The retaining device 1 comprises a cover 4 which can be pivoted about a pivot axis 5 and a pressing plate 6 which is movable in the direction of the cover 4 by means of at least one cylinder 7.

Figure 2:
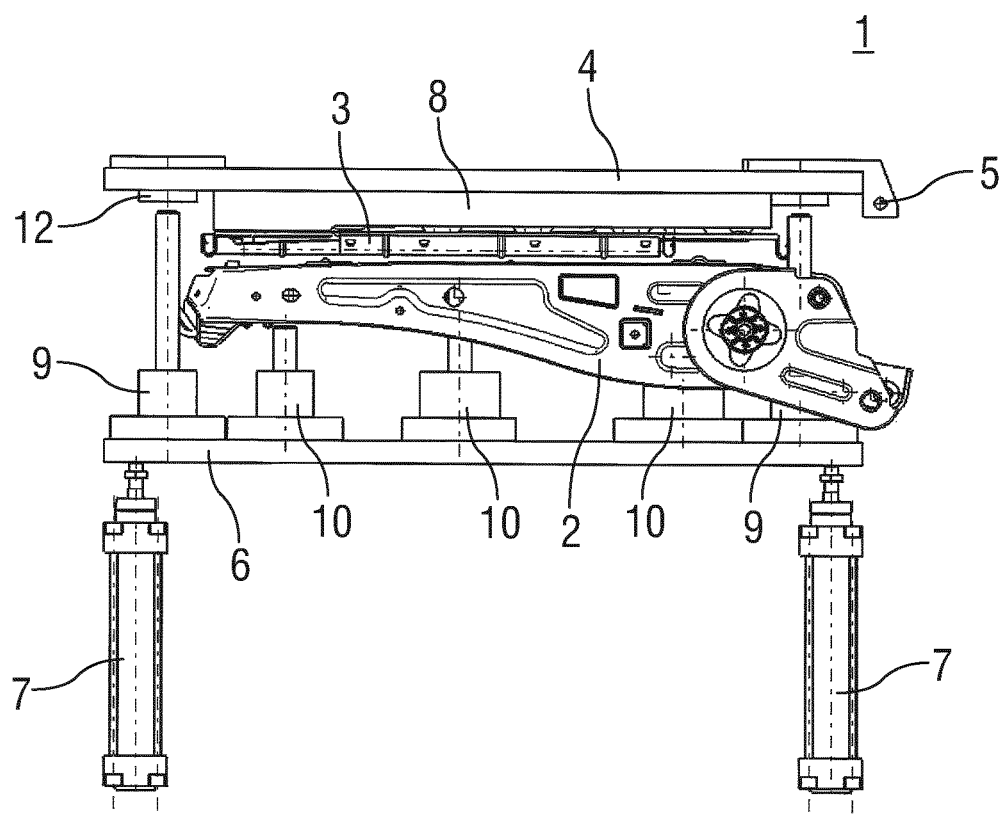
FIG. 2 is a schematic side view of a retaining device according to the invention.

FIG. 2 is a schematic side view of a retaining device 1 according to the invention with components 2, 3 arranged therein.

The two components 2, 3 are generally arranged between the cover 4 and pressing plate 6 at least partially one above the other and pressed between the cover 4 and pressing plate 6. The components 2, 3 are thereby in form-fitting and/or force-fitting abutment with each other, in particular without any air gap. In this instance, the first lower component 2 is preferably constructed as a backrest frame and the second upper component 3 as a backrest sheet.

There is generally arranged on the cover 4 a plurality of cylinders which act locally on the upper component 3.

According to the invention, there is arranged on the cover 4 a silicone layer 8 which replaces this plurality of cylinders. In this instance, the silicone layer 8 is constructed so as to correspond to the upper component 3 so that the silicone layer 8 and component 3 are extensively in abutment with each other and any localized loading or introduction of force into the component 3 is prevented.

Advantageously, the silicone layer 8 is constructed so as to be compressible. In this manner and as a result of the extensive abutment between the silicone layer 8 and component 3, there is produced a particularly uniform introduction of force into the component 3. It is thereby possible to use components 3 with a material thickness which is reduced with respect to the prior art since deformations, which conventionally occur in thin sheet metal components and which are also referred to as markings, are prevented by the cylinders which act locally on the component 3.

In a first embodiment, the silicone layer 8 is formed from a single silicone block element. This enables rapid and simple replacement of a worn or damaged silicone layer 8.

In a second embodiment, the silicone layer 8 is composed of a plurality of individual silicone block elements. In this instance, for example, portions of the silicone layer 8 which are subjected to particularly high thermal loads, for example, in the region of the weld connections which are intended to be produced, can be replaced separately from the remaining silicone layer 8.

The silicone layer 8 is arranged in a form-fitting and/or force-fitting manner on the cover 4. The silicone layer 8 can thereby be readily replaced. The form-fitting and/or force-fitting connection is constructed, for example, as a conventional screw type connection or as a bayonet type connection.

The silicone layer 8 is arranged on the cover 4 in a reversible manner. It is thereby possible to use a retaining device 1 in a variable manner by means of differently profiled silicone layers 8 in order to connect components 2, 3 which are differently formed.

At the upper side of the pressing plate 6, in a state directed in the direction of the components 2, 3 and the cover 4, there are arranged a plurality of conventional guides 9 and/or retaining means 10 which receive the first component 2 and accordingly orientate the second component 3.

Figure 3:
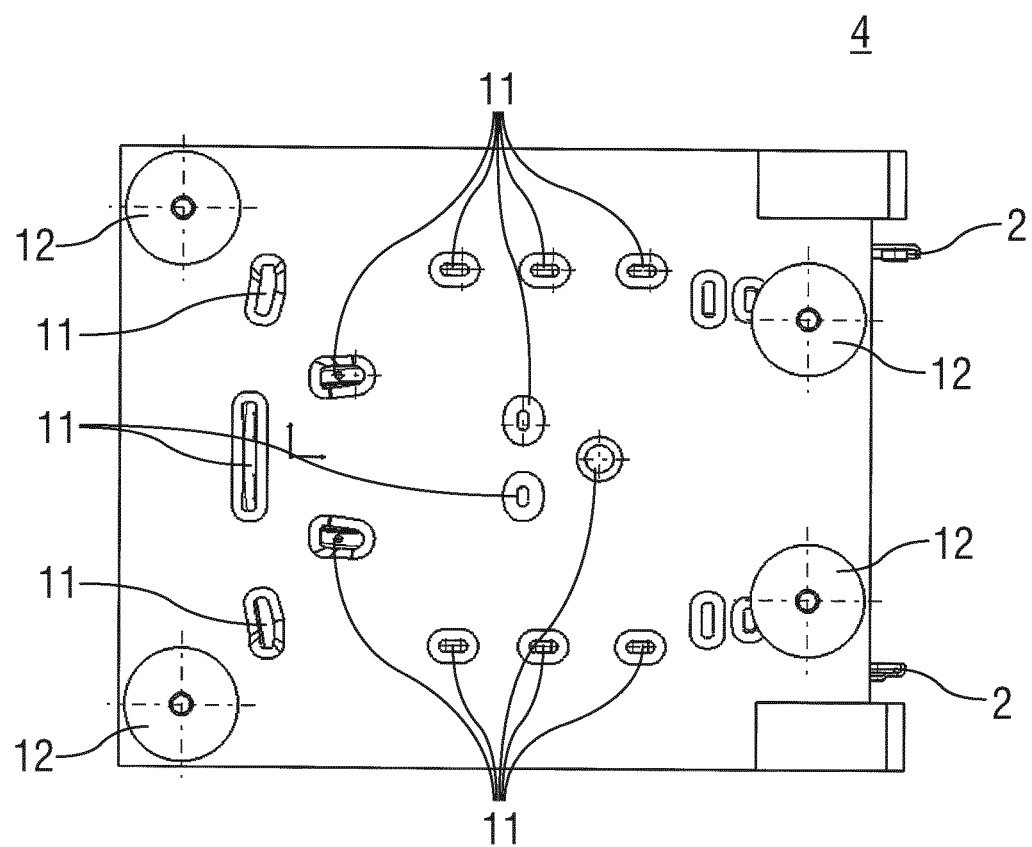
FIG. 3 is a schematic plan view of a retaining device according to the invention.

FIG. 3 is a schematic plan view of a retaining device 1 according to the invention.

There are arranged in the cover 4 in the region of bonded connections, which are intended to be produced between the components 2, 3, recesses 11 which extend through the cover 4 and silicone layer 8. The bonded connections are in this instance preferably constructed as a local weld connection produced by means of a laser beam welding method. The recesses 11 are preferably constructed in a circular or oval manner. Furthermore, the recesses 1 may taper in a funnel-like manner in the direction of the component 3, as shown in the sectioned illustration in FIG. 4.

Furthermore, receiving means 12 for receiving the guides 9 of the pressing plate 6 are preferably arranged at the edge side in the cover 4.

Figure 4:
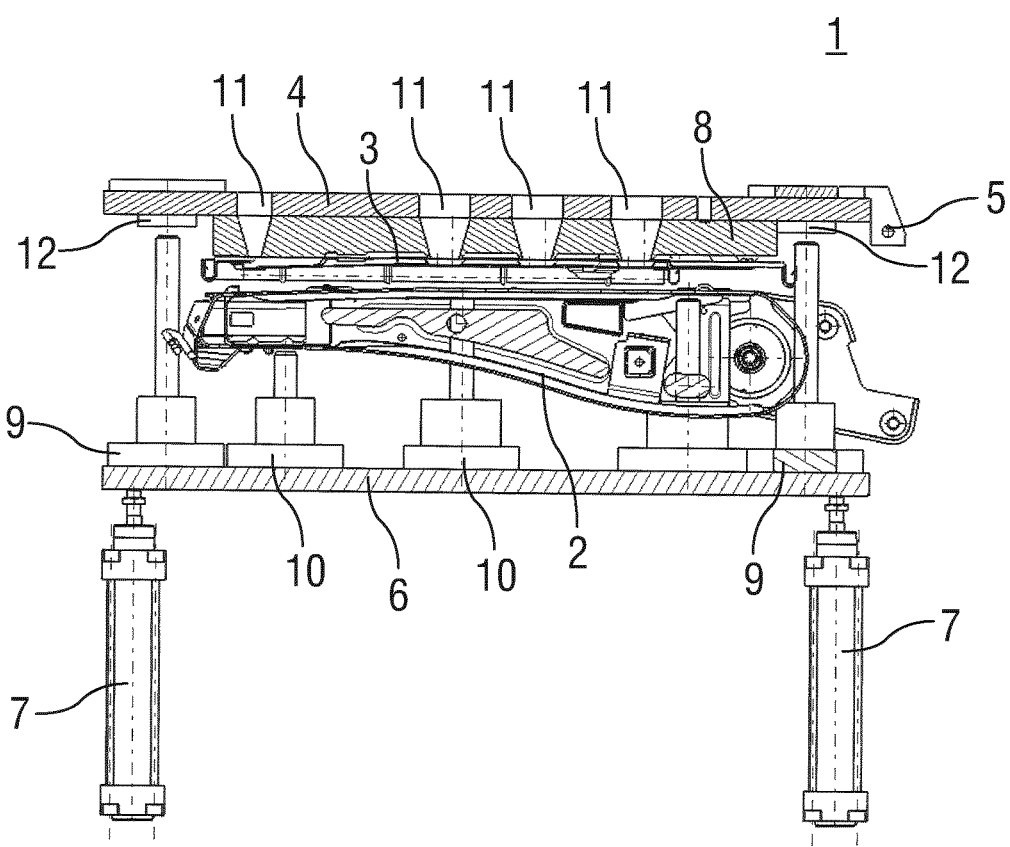
FIG. 4 is a schematic lateral cross-sectional view of a retaining device according to the invention in the open state.

FIG. 4 is a schematic lateral cross-section of a retaining device 1 according to the invention in the open state.

Figure 5:
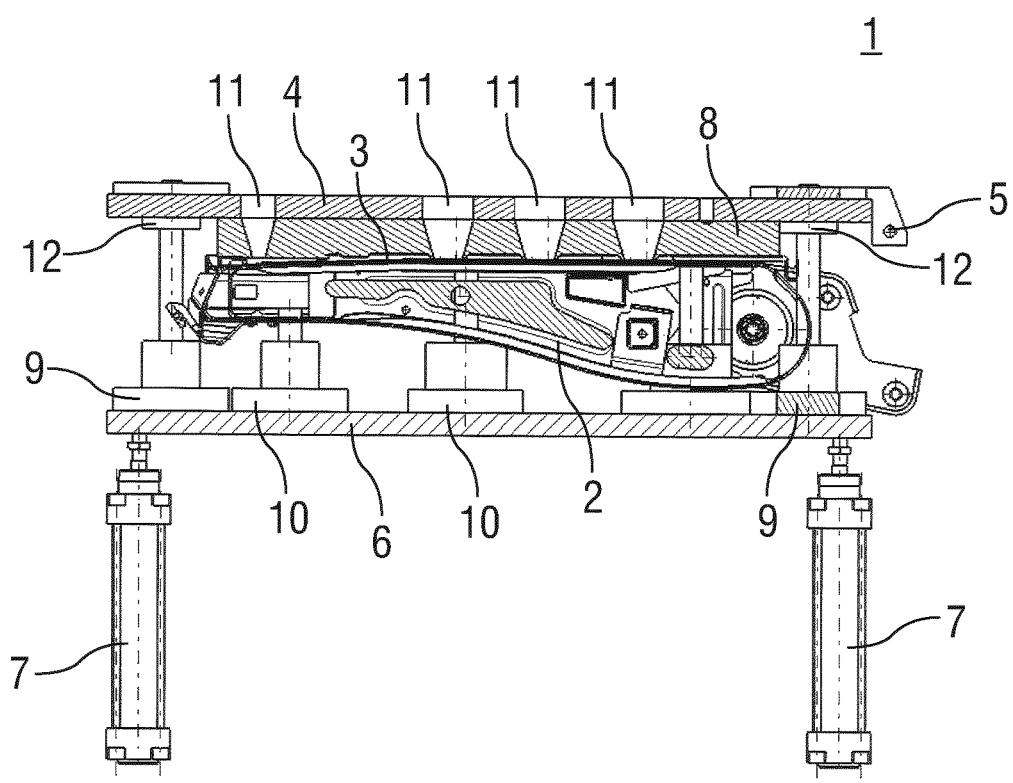
FIG. 5 is a schematic lateral cross-sectional view of a retaining device according to the invention in the closed state.

FIG. 5 is a schematic lateral cross-section of a retaining device 1 according to the invention in the closed state.

When the method for operating the retaining device 1 is carried out, in a first method step the first component 2 is placed on the guides 9 and/or retaining means 10 which are arranged on the pressing plate 6.

In a second method step, the second component 3 is placed on the first component 2 and orientated by means of the guides 9.

In a third method step, the pivotable cover 4 is pivoted with the silicone layer 8 about the pivot axis 5 in the direction of the second component 3 and subsequently locked in such a manner that the silicone layer 8 and the second component 3 are extensively in abutment with each other. This is illustrated in FIG. 4.

In a fourth method step, the pressing plate 6 is moved by means of at least one cylinder 7 in the direction of the cover 4. The components 2, 3 which are arranged between the cover 4 and the pressing plate 6 one above the other are thereby pressed against each other without any air gap and against the silicone layer 8, as illustrated in FIG. 5.

In a fifth method step, the components 2, 3 which are pressed against each other between the cover 4 and pressing plate 6 are welded to each other through recesses 11 which extend through the cover 4 and silicone layer 8. In this instance, a laser welding method is preferably used.

In a sixth method step, a component assembly which is formed by the welded components 2, 3 is removed from the retaining device 1 after a pivoting movement of the cover 4.

While specific embodiments of the invention have been shown and described in detail to illustrate the application of the principles of the invention, it will be understood that the invention may be embodied otherwise without departing from such principles.

The invention claimed is:

1. A retaining device for the form-fitting and/or force-fitting arrangement of two components to be connected in a bonded manner for a subsequent welding operation, the retaining device comprising:
   a cover which can be pivoted about a pivot axis;
   a silicone layer arranged on a lower side of the cover, the silicone layer being directed in a direction of the components to be connected;
   a pressing plate; and
   at least one cylinder, the pressing plate being movable in the direction of the cover by means of the at least one cylinder, the pressing plate pressing the components, which are arranged one above the other between the cover and pressing plate and which are intended to be connected, against the silicone layer, wherein recesses are arranged in a region of bonded connections, which are intended to be formed between the components, the recesses extending through the cover and the silicone layer.

2. The retaining device as claimed in claim 1, wherein the silicone layer is constructed so as to correspond to an upper component of the two components.

3. The retaining device as claimed in claim 1, wherein the silicone layer is constructed so as to be compressible.

4. The retaining device as claimed in claim 1, wherein the silicone layer is formed from a single silicone block element.

5. The retaining device as claimed in claim 1, wherein the silicone layer is comprised of a plurality of individual silicone block elements.

6. The retaining device as claimed in claim 1, wherein the silicone layer is arranged on the cover in a form-fitting and/or force-fitting manner.

7. The retaining device as claimed in claim 1, wherein the silicone layer is arranged on the cover in a reversible manner.

8. The retaining device as claimed in claim 6, wherein the silicone layer is screwed to the cover.

9. A method for operating a retaining device, the method comprising the steps of:
   providing a retaining device comprising a cover which can be pivoted about a pivot axis, a silicone layer arranged on the lower side of the cover, the silicone layer being directed in a direction of the components to be connected a pressing plate; and at least one cylinder, the pressing plate being movable in the direction of the cover by means of the at least one cylinder;
   placing a first component on guides and/or retention means which are arranged on a pressing plate;
   placing a second component on the first component and orienting the second component with the guides;
   pivoting the pivotable cover, having the silicone layer, in the direction of the second component and locked in such a manner that the silicone layer and the second component are extensively in abutment with each other;
   moving the pressing plate in the direction of the cover by means of at least one cylinder;
   welding the components, which are pressed against each other between the cover and the pressing plate, to each other through recesses which extend through the cover and silicone layer; and
   removing the component assembly formed by the components from the retaining device after a pivoting movement of the cover.

10. The retaining device as claimed in claim 1, wherein the silicone layer replaces a number of cylinders.

11. A retaining device for the form-fitting and/or force-fitting arrangement of two components to be connected in a bonded manner for a subsequent welding operation, the retaining device comprising:
   a cover which can be pivoted about a pivot axis;
   a silicone layer arranged on a lower side of the cover, the silicone layer being directed in a direction of the components to be connected;
   a pressing plate; and
   at least one cylinder, wherein only the pressing plate is moved by the at least one cylinder such that the pressing plate is movable in the direction of the cover by means of the at least one cylinder, the pressing plate pressing the components, which are arranged one above the other between the cover and the pressing plate and which are intended to be connected, against the silicone layer, wherein recesses are arranged in a region of bonded connections, which are intended to be formed between the components, the recesses extending through the cover and the silicone layer.

12. The retaining device as claimed in claim 11, wherein the cover and the silicone layer are not moved by the at least one cylinder.

13. The retaining device as claimed in claim 11, wherein said cover is in a fixed position relative to said pressing plate when the pressing plate is moved by the at least one cylinder.

* * * * *